DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 420

T896,021
STABILIZED OXIDIZED-POLYETHYLENE COMPOSITIONS

Daniel L. Edwards, Jr., and Sarah J. Dickerson, both of P.O. Box 511, Kingsport, Tenn. 37662

Continuation of application Ser. No. 779,245, Nov. 26, 1968. This application Aug. 14, 1970, Ser. No. 63,951
Int. Cl. C08f *45/46*
U.S. Cl. 260—29.6 MP
No Drawing. 15 Pages Specification

Compositions of stabilized oxidized-polyethylene are provided which have improved color stability when reacted with alkaline reagents. The improved color stability is obtained by incorporating into the oxidized-polyethylene a stabilizing amount of a phosphorus-containing compound which is (1) an oxy acid of phosphorus in which the phosphorus atom has an oxidation state of +1 or +3; (2) an alkali metal salt of an oxy acid as described in (1) wherein the alkali metal is lithium, sodium, or potassium; or (3) a reaction product of an oxy acid as described in (1) with ammonia, morpholine, or a primary, secondary or tertiary amine having 1 to 6 carbon atoms.